US010015396B2

(12) United States Patent
Huang

(10) Patent No.: US 10,015,396 B2
(45) Date of Patent: Jul. 3, 2018

(54) VIDEO DOORBELL SYSTEM AND RELATED POWER SUPPLY ADJUSTING METHOD

(71) Applicant: VIVOTEK INC., New Taipei City (TW)

(72) Inventor: Yen-Chieh Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 219 days.

(21) Appl. No.: 15/166,225

(22) Filed: May 26, 2016

(65) Prior Publication Data

US 2016/0360105 A1 Dec. 8, 2016

(30) Foreign Application Priority Data

Jun. 4, 2015 (TW) .............................. 104118093 A

(51) Int. Cl.
*H04N 7/18* (2006.01)
*H04N 5/232* (2006.01)

(52) U.S. Cl.
CPC ......... *H04N 5/23241* (2013.01); *H04N 7/186* (2013.01)

(58) Field of Classification Search
CPC ............................ H04N 5/23241; H04N 7/186
See application file for complete search history.

(56) References Cited

U.S. PATENT DOCUMENTS

| 5,995,139 | A | * | 11/1999 | Lee | ................... | H04N 7/186 |
| | | | | | | 340/539.1 |
| 7,023,327 | B1 | * | 4/2006 | Chen | ................... | G08B 3/10 |
| | | | | | | 340/326 |

* cited by examiner

*Primary Examiner* — Sathyanaraya V Perungavoor
*Assistant Examiner* — Peet Dhillon
(74) *Attorney, Agent, or Firm* — Winston Hsu

(57) ABSTRACT

A video doorbell system coupled with a ringtone generating unit is applied by a power supply adjusting method and includes a video generating module and a mode switching controller. The video generating module includes a power storing component. The mode switching controller can be switched into a first mode or a second mode in a remote controlling manner. While the mode switching controller is switched into the first mode, the ringtone generating unit is bypassed and an external power source is connected to the video generating module, so as to charge the power storing component by the external power source. While the mode switching controller is switched into the second mode, the video generating module is bypassed and the external power source is connected to the ringtone generating unit, and the video generating module can execute image capturing function via the power storing component.

16 Claims, 6 Drawing Sheets

VIDEO DOORBELL SYSTEM AND RELATED POWER SUPPLY ADJUSTING METHOD

BACKGROUND OF THE INVENTION

1. Field of the Invention

The present invention relates to a video doorbell system, and more particularly, to a video doorbell system and a related power supply adjusting method capable of matching any doorbell without constraint.

2. Description of the Prior Art

Please refer to FIG. 1. FIG. 1 is a diagram of a doorbell circuit system in the prior art. The conventional doorbell circuit system 50 includes a power supply 52, a doorbell 54 and a camera 56. The doorbell 54 and the camera 56 are electrically connected to the power supply 52 in series connection for establishing the circuit system. Energy acquirement of the camera 56 is affected by electric consumption of the doorbell 54; for providing sufficient energy to the camera, the doorbell 54 is short-circuited and the camera 56 can acquire full energy of the power supply 52 for complete operation. However, alternative of the doorbell 54 and the camera 56 does not conform to consumer's demand, and design of a doorbell system capable of keeping function of the doorbell and the camera is an important issue in the related industry.

SUMMARY OF THE INVENTION

The present invention provides a video doorbell system and a related power supply adjusting method capable of matching any doorbell without constraint for solving above drawbacks.

According to the claimed invention, a video doorbell system coupled with a ringtone generating unit is disclosed. The video doorbell system includes a video generating module and the mode switching controller. The video generating module includes a power storing component and is adapted to execute an image capturing function. The mode switching controller is adapted to switch into a first mode or a second mode in a remote controlling manner. The ringtone generating unit is bypassed to connect an external power source with the video generating module while the mode switching controller is switched into the first mode, so as to charge the power storing component by the external power source. The video generating module is bypassed to connect the external power source with the ringtone generating unit while the mode switching controller is switched into the second mode, so as to provide energy to the video generating module via the power storing component for execution of the image capturing function.

According to the claimed invention, a power supply adjusting method is applied to a video doorbell system, and the video doorbell system is coupled with a ringtone generating unit. The video doorbell system includes a video generating module, a mode switching controller and a pressing unit. The video generating module includes a power storing component and is adapted to execute an image capturing function. The power supply adjusting method includes switching the mode switching controller from a first mode to a second mode in a remote controlling manner by a control signal generated by actuation of the pressing unit so as to bypass the video generating module and to connect an external power source with the ringtone generating unit, and switching the mode switching controller into the first mode automatically according to a clocking function of the mode switching controller, so as to bypass the ringtone generating unit and to connect the external power source with the video generating module for charging the power storing component by the external power source. The power storing component provides energy to the video generating module for execution of the image capturing function.

The video doorbell system of the present invention has the mode switching controller providing the remote controlling function. The video generating module of the first embodiment can be preferably applied to the mechanical doorbell, and the video generating module of the second embodiment can be preferably applied to the electric doorbell. The external power source is connected with the video generating module while the mode switching controller is in the standby mode, and is transformed to connect with the ringtone generating unit while the doorbell is actuated, so that the video generating module can adequately use energy of the external power source without constraint of the doorbell and the related ringtone generating unit. Besides, the video generating module can include a plurality of diodes and capacitors selectively, the diodes can avoid circuit damage by signal backflow, and the capacitors provide auxiliary filtering function accordingly. Comparing to the prior art, the video doorbell system of the present invention can provide sufficient energy to the video generating module for execution of the image capturing function by keeping original function of the common doorbell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
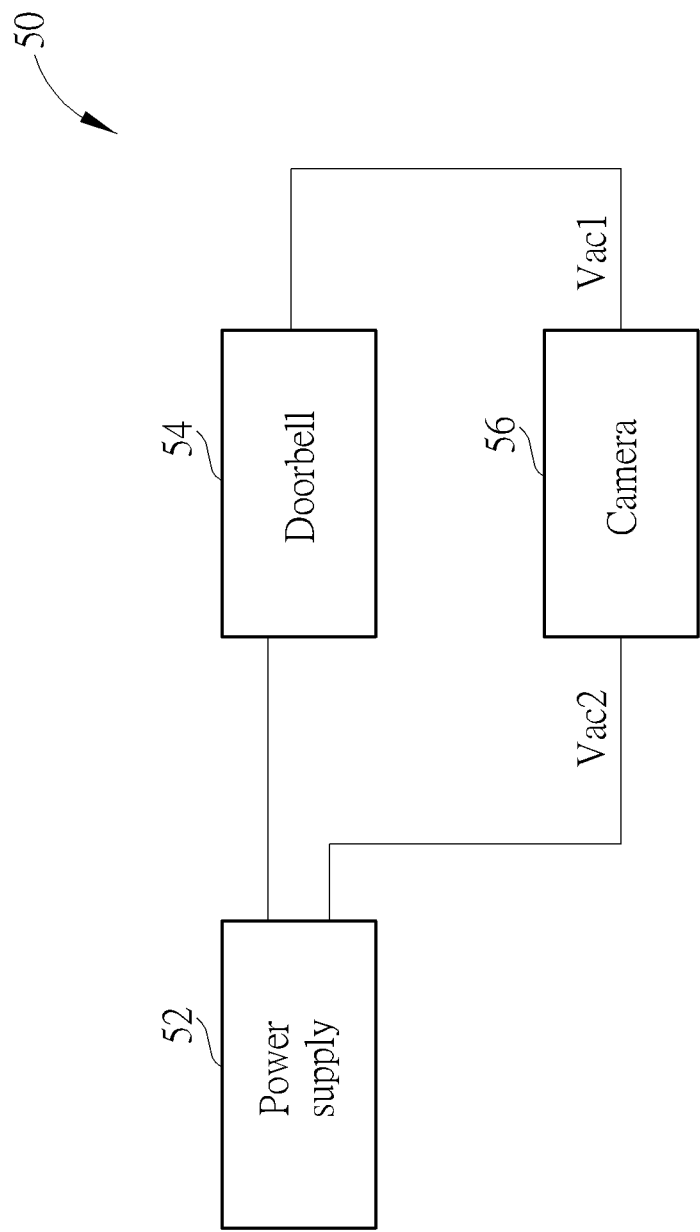
FIG. 1 is a diagram of a doorbell circuit system in the prior art.
Figure 2A:
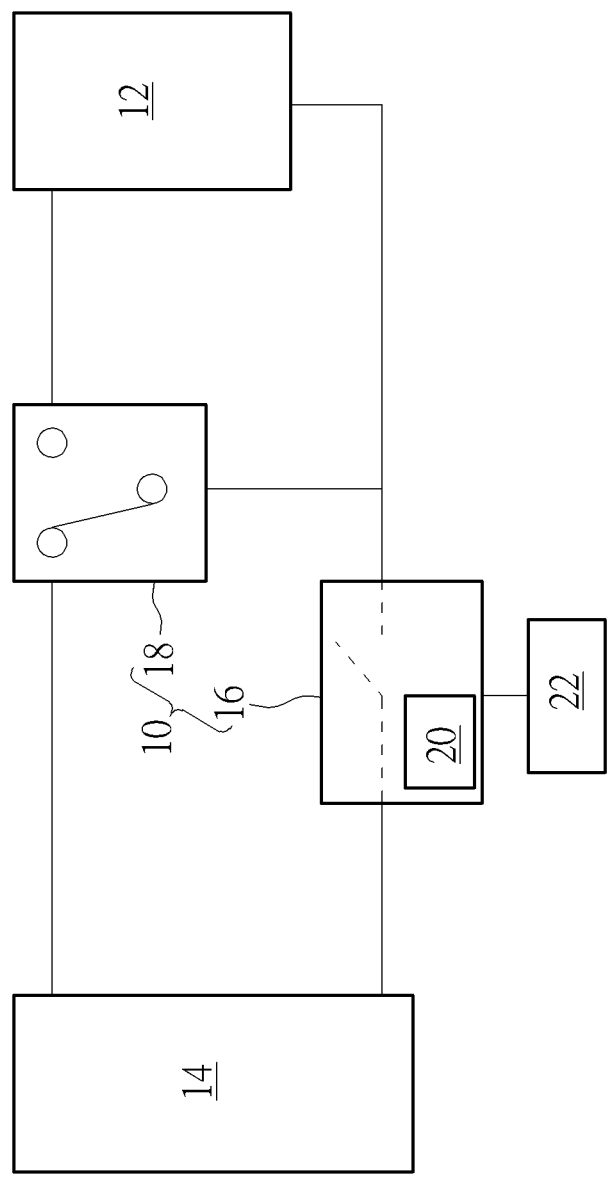
FIGS. 2A and 2B respectively are diagrams of a video doorbell system in different modes according to an embodiment of the present invention.
Figure 2B:
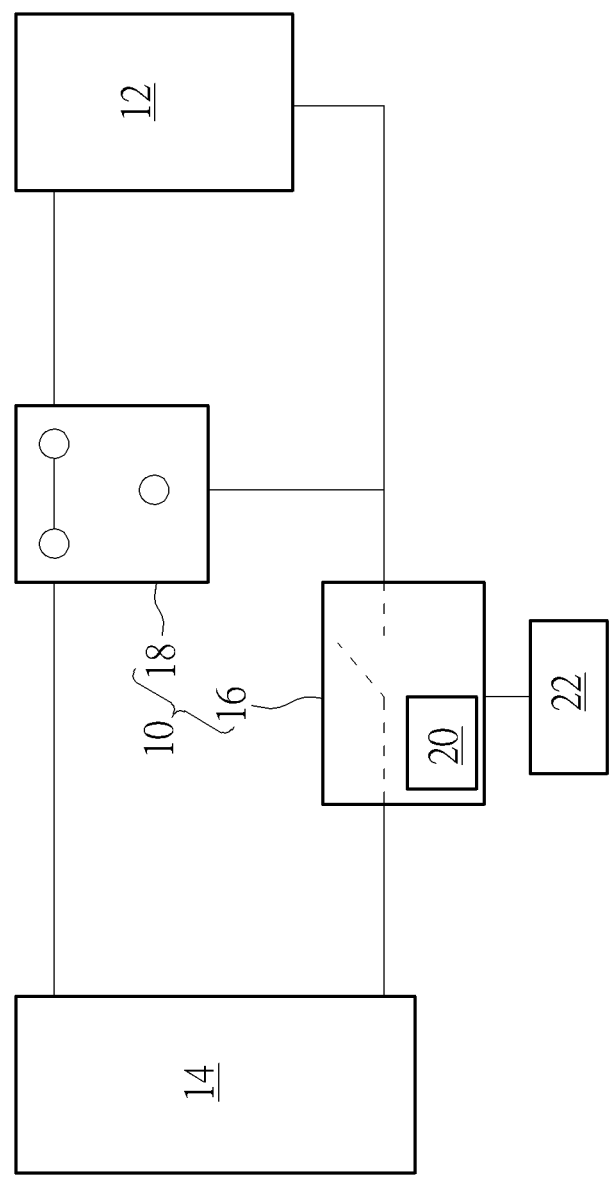

Please refer to FIGS. 2A and 2B. FIGS. 2A and 2B respectively are diagrams of a video doorbell system 10 in different modes according to an embodiment of the present invention. The video doorbell system 10 is coupled with a ringtone generating unit 12, and the video doorbell system 10 and the ringtone generating unit 12 are powered by an external power source 14. The ringtone generating unit 12 can be apart of the common doorbell. The external power source 14 usually can be the city power with AC electric supply. The video doorbell system 10 includes a video generating module 16 and a mode switching controller 18. The video generating module 16 is utilized to execute an image capturing function; for example, while the doorbell is actuated, the ringtone generating unit 12 generates an alarm ring and the video generating module 16 simultaneously captures an image of the visitor who presses the doorbell. Further, the video generating module 16 may have a motion detector, while a dynamic object is detected by the motion detector, the video generating module 16 can immediately capture the monitoring image no matter who presses the doorbell or not. Application of the video generating module 16 is not limited to the above-mentioned embodiment, and depends on design demand.

It should be mentioned that the video generating module 16 includes a power storing component 20 adapted to store energy while the video generating module 16 is connected with the external power source 14 (the city power) and further to provide the energy to the video generating module 16 without power supply from the external power source 14 (the city power). The mode switching controller 18 can switch the video doorbell system 10 into a first mode or a second mode, but not being limited to, in a remote controlling manner. While the mode switching controller 18 is switched into the first mode, such as a standby mode of the video doorbell system 10 shown in FIG. 2A, the ringtone generating unit 12 is bypassed to connect the external power source 14 with the video generating module 16, and the power storing component 20 is charged by the external power source 14 for storing the energy. While the mode switching controller 18 is switched into the second mode, such as a working mode of the video doorbell system 10 shown in FIG. 2B, the ringtone generating unit 12 is connected with the external power source 14 to generate the alarm ring, the video generating module 16 is bypassed to interrupt connection with the external power source 14 and then executes the image capturing function driven by the power storing component 20, so the user of the video doorbell system 10 can acquire an image containing information of the visitor as the visitor presses the doorbell.

The pressing unit 22 of the video doorbell system 10 may be a part of the conventional doorbell. The pressing unit 22 is electrically connected to the video generating module 16, and can generate a control signal (such as the negative half-cycle signal or the positive half-cycle signal) while the doorbell is pressed and actuated. Modes of the mode switching controller is switched by the control signal in wire connection or wireless connection, which means the mode switching controller 18 can be switched from the standby mode to the working mode, as shown in FIG. 2A and 2B, and the control signal may be actuated to switch the mode switching controller 18 by a wireless transmitting manner. Then, the power storing component 20 is not charged by the external power source 14, and the external power source 14 provides energy to the ringtone generating unit 12 for generation of the alarm ring. The mode switching controller 18 can have a clocking function which is activated as the mode switching controller 18 is switched into the working mode, the mode switching controller 18 can be automatically switched back the standby mode after a predetermined period, and the external power source 14 provides energy to the power storing component 20 instead of charging the ringtone generating unit 12.

Figure 3:
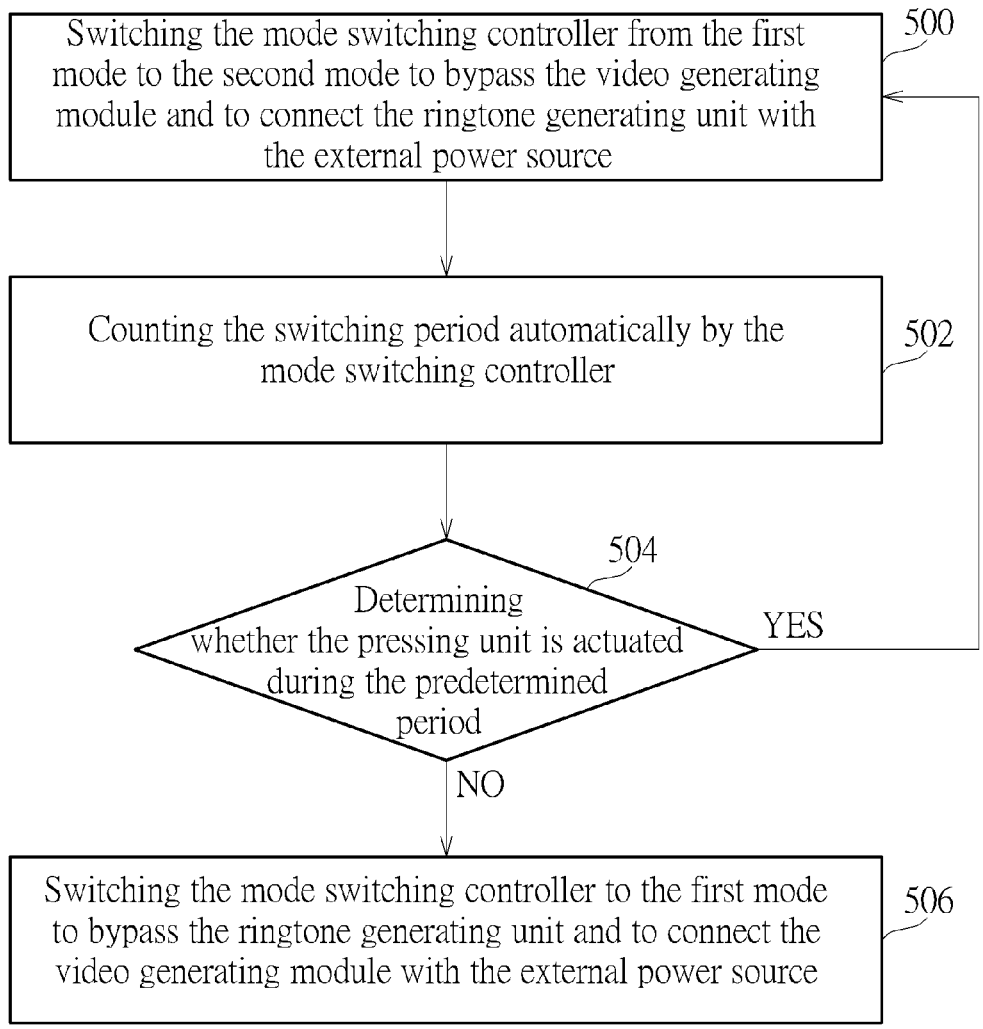
FIG. 3 is a flow chart of a power supply adjusting method according to an embodiment of the present invention.

Please refer to FIG. 3. FIG. 3 is a flow chart of a power supply adjusting method according to an embodiment of the present invention.

The power supply adjusting method illustrated in FIG. 3 is suitable for the video doorbell system 10 shown in FIGS. 2A and 2B. An initial mode of the video doorbell system 10 is the standby mode. Step 500 is executed while detecting actuation of the pressing unit 22, the mode switching controller 18 is switched from the first mode (the standby mode) into the second mode (the working mode) by the control signal; meanwhile, the video generating module 16 is bypassed to connect the ringtone generating unit 12 with the external power source 14, the ringtone generating unit 12 generates the alarm ring accordingly, and the video generating module 16 executes the image capturing function by energy of the power storing component 20. Then, steps 502 and 504 are executed that the mode switching controller 18 counts a period whenever the video doorbell system 10 is switched into the standby mode, to determine whether the pressing unit 22 is actuated during the predetermined period (which is set as, but not limited to, thirty seconds in this embodiment). As the pressing unit 22 is not actuated during the predetermined period, step 506 is executed to automatically switch the mode switching controller 18 into the first mode, which means the ringtone generating unit 12 is bypassed to connect the external power source 14 with the video generating module 16, and the video doorbell system 10 is recovered to the initial mode. As the pressing unit 22 is actuated during the predetermined period, step 500 is executed to re-trigger the mode switching controller 18 and actuate the ringtone generating unit 12.

The image capturing function of the video generating module further can be actuated in the standby mode or the working mode by the motion detecting technique (such like the foresaid motion detector), and power of the said video generating module is provided by the power storing component 20 instead of the external power source 14. Actuation of the video generating module 16 is not limited to the above-mentioned embodiment, and a detailed description is omitted herein for simplicity. In addition, the image capturing function of the video generating module 16 can be transformed as making a monitoring video film; in this embodiment, the external power source 14 not only charges the power storing component 20 but also directly provides energy to the video generating module 16 while the video doorbell system 10 is in the first mode.

Figure 4:
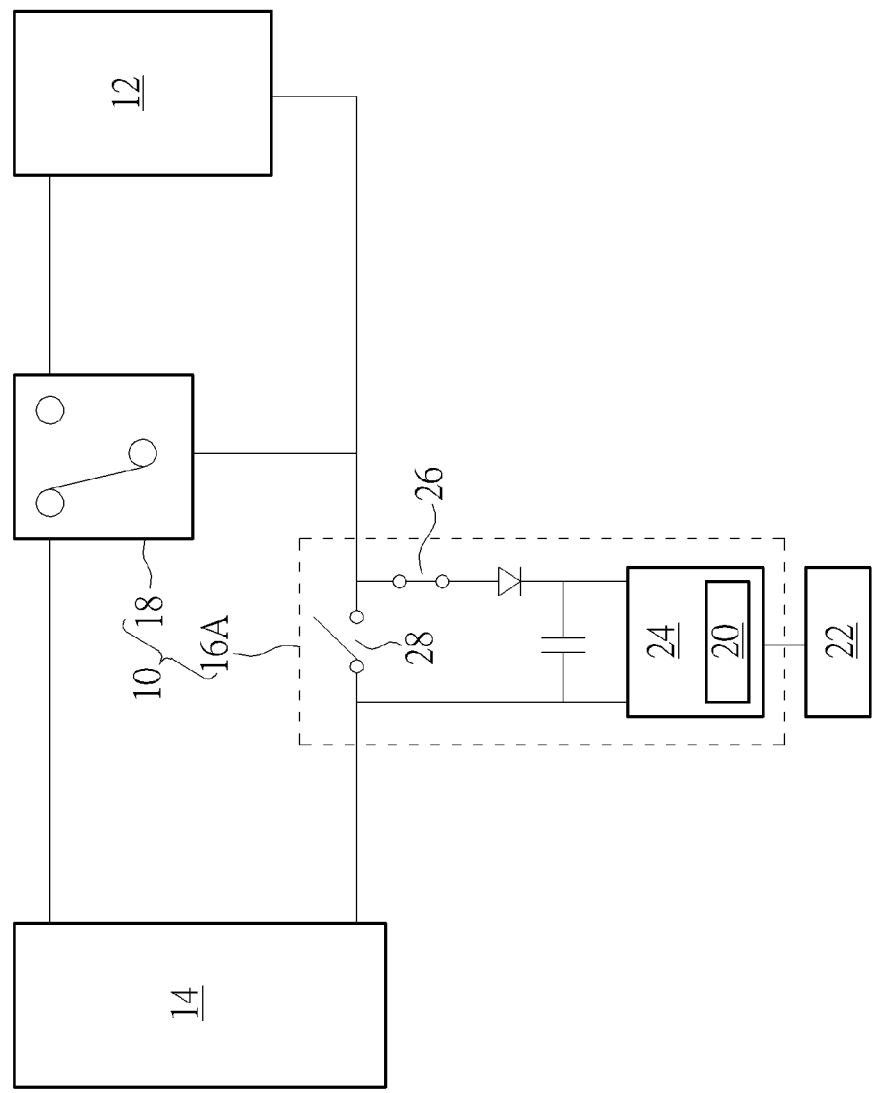
FIG. 4 is a diagram of a video generating module according to a first embodiment of the present invention.

Please refer to FIG. 3 and FIG. 4. FIG. 4 is a diagram of the video generating module 16A according to a first embodiment of the present invention. The video generating module 16A can include an image capturing unit 24, a first circuit switch 26 and a second circuit switch 28. The first circuit switch 26 and the second circuit switch 28 are connected to the image capturing unit 24 respectively in series connection and parallel connection. While the mode switching controller 18 is switched into the first mode, the first circuit switch 26 is short-circuited to connect the external power source 14 with the power storing component 20 and the image capturing unit 24, and the second circuit switch 28 is open-circuited. As the pressing unit is actuated, the first circuit switch 26 is switched to an open-circuited mode and the second circuit switch 28 is switched to a close-circuited mode, the mode switching controller 18 is driven by the control signal of the second circuit switch 28 to switch into the second mode. Moreover, the video generating module 16A has the clocking function capable of switching the second circuit switch 28 and the first circuit switch 26 back the initial mode after the specific period by counting.

While the video generating module 16A is in the initial mode, the first circuit switch 26 is short-circuited, the second circuit switch 28 is open-circuited, and the external power source 14 provides energy to the video generating module 16A via the mode switching controller 18. In step 500, the first circuit switch 26 is open-circuited and the second circuit switch 28 is short-circuited, so the video generating module 16A is not charged by the external power source 14 but powered by the power storing component 20, and the external power source 14 provides energy to the ringtone generating unit 12. The mode switching controller 18 is switched into the working mode by the control signal of the second circuit switch 28 in the short-circuited mode, the ringtone generating unit 12 generates the alarm ring driven by the external power source 14, and the second circuit switch 28 is switched back the open-circuited mode after the first period (which can be equal to one sixty second). In step 504, the first circuit switch 26 is switched into the short-circuited mode after the second period (which can be equal to thirty seconds), and preferably the first circuit switch 26 is short-circuited to connect the external power source 14 with the power storing component 20 and the image capturing unit 24 after the mode switching controller 18 is switched into the first mode. That is, the second period is different from the first period, and the first period is shorter than the second period in each embodiment of the present invention. Time length of the first period and the second period are not limited to the above-mentioned embodiment, which depends on design demand.

Figure 5:
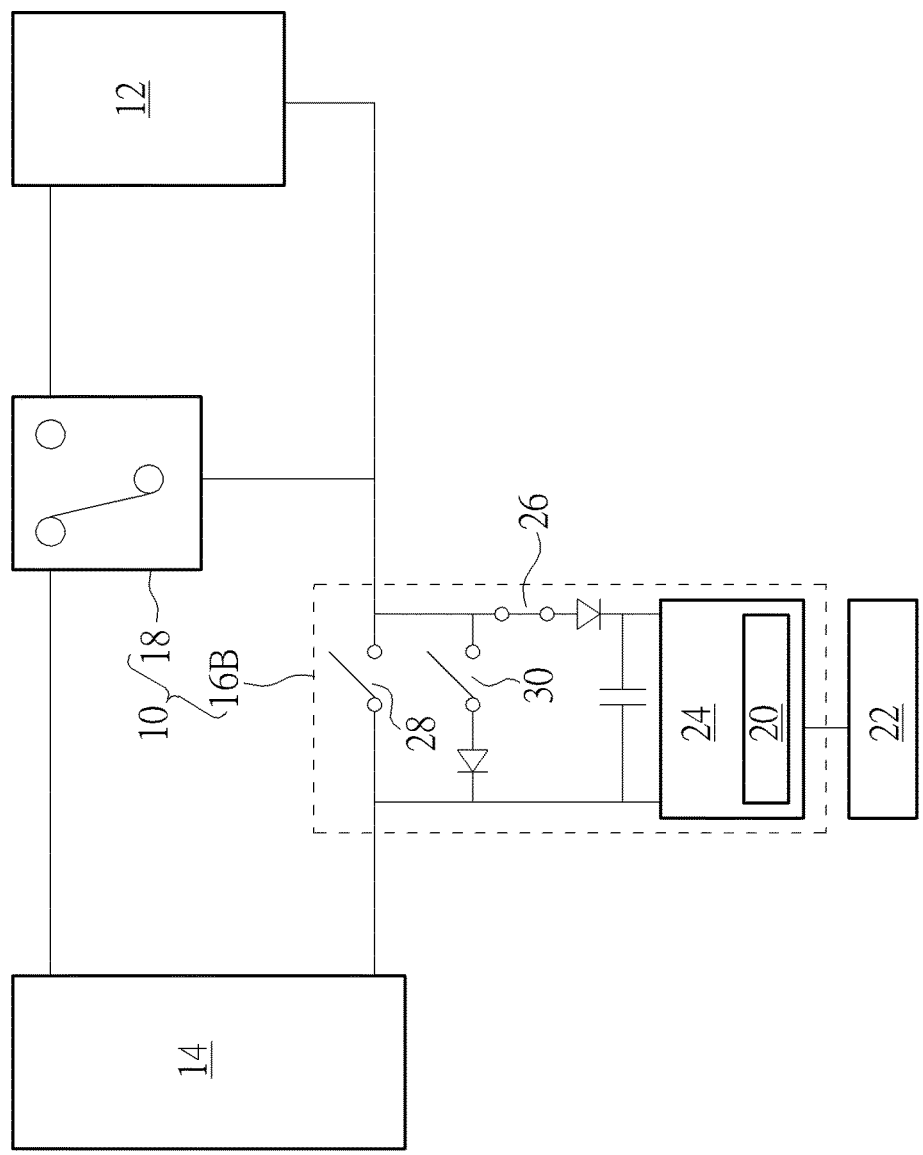
FIG. 5 is a diagram of the video generating module according to a second embodiment of the present invention.

Please refer to FIG. 3 and FIG. 5. FIG. 5 is a diagram of the video generating module 16B according to a second embodiment of the present invention. The video generating module 16B can include the image capturing unit 24, the first circuit switch 26, the second circuit switch 28 and a third circuit switch 30. The first circuit switch 26 is electrically connected to the image capturing unit 24 in series connection, and the second circuit switch 28 and the third circuit switch 30 are electrically connected to the image capturing unit 24 in parallel connection. While the mode switching controller is into the first mode, the first circuit switch 26 is short-circuited to connect the external power source 14 with the power storing component 20 and the image capturing unit 24, and the second circuit switch 28 and the third circuit switch 30 are open-circuited. As the pressing unit 22 is actuated, the first circuit switch 26 is switched to the open-circuited mode and the second circuit switch 28 is switched to the short-circuited mode, and the mode switching controller 18 is switched into the second mode by the control signal of the second circuit switch 28. After generation of the control signal, the second circuit switch 28 is switched back the open-circuited mode accordingly, and the third circuit switch 30 is immediately switched into the short-circuited mode while the second circuit switch 28 is open-circuited, to continuously connect the external power source 14 with the ringtone generating unit 12.

The video generating module 16B may have the clocking function. While the video generating module 16B is in the initial mode, the first circuit switch 26 is short-circuited, the second circuit switch 28 and the third circuit switch 30 are open-circuited, and the external power source 14 provides energy to the power storing component 20. In step 500, the first circuit switch 26 is switched into the open-circuited mode and the second circuit switch 28 is switched into the short-circuited mode, the mode switching controller 18 is switched into the working mode by the control signal of the second circuit switch 28 in the short-circuited mode. The external power source 14 does not provide energy to the video generating module 16 but drives the ringtone generating unit 12 to generate the alarm ring. The second circuit switch 28 is switched from the short-circuited mode to the open-circuited mode after the first period (which can be equal to one sixty second) ; then, the third circuit switch 30 is immediately switched into the short-circuited mode while the second circuit switch 28 is open-circuited, and is further switched into the open-circuited mode after the third period (which can be equal to twenty-nine seconds) . Therefore, the third period is counted by, but not limited to, the video generating module 16B while the first period is ended. In step 504, the third circuit switch 30 is switched into the open-circuited mode, the mode switching controller 18 is switched into the first mode, and the first circuit switch 26 is sequentially switched into the short-circuited mode (after the second period equal to thirty seconds, which is larger than an amount of the first period and the third period) to connect the external power source 14 with the power storing component 20 and the image capturing unit 24 for recovering the video doorbell system 10 into the standby mode.

In conclusion, the video doorbell system of the present invention has the mode switching controller providing the remote controlling function. The video generating module of the first embodiment can be preferably applied to the mechanical doorbell, and the video generating module of the second embodiment can be preferably applied to the electric doorbell. The external power source is connected with the video generating module while the mode switching controller is in the standby mode, and is transformed to connect with the ringtone generating unit while the doorbell is actuated, so that the video generating module can adequately use energy of the external power source without constraint of the doorbell and the related ringtone generating unit. Besides, the video generating module can include a plurality of diodes and capacitors selectively, the diodes can avoid circuit damage by signal backflow, and the capacitors provide auxiliary filtering function accordingly. Comparing to the prior art, the video doorbell system of the present invention can provide sufficient energy to the video generating module for execution of the image capturing function by keeping original function of the common doorbell.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video doorbell system coupled with a ringtone generating unit, the video doorbell system comprising:
   a video generating module comprising a power storing component and adapted to execute an image capturing function; and
   a mode switching controller electrically connected between an external power source, the ringtone generating unit and the video generating module, the mode switching controller being adapted to switch into a first mode for conducting the external power source and the video generating module or a second mode for conducting the external power source and the ringtone generating unit in a remote controlling manner, the ringtone generating unit being bypassed to connect the external power source with the video generating module while the mode switching controller is switched into the first mode so as to charge the power storing component by the external power source, the video generating module being bypassed to connect the external power source with the ringtone generating unit while the mode switching controller is switched into the second mode so as to provide energy to the video generating module via the power storing component for execution of the image capturing function.

2. The video doorbell system of claim 1, wherein the mode switching controller provides a clocking function, and is automatically switched from the second mode to the first mode after a predetermined period.

3. The video doorbell system of claim 1, wherein the video generating module is driven by the power storing component to actuate the image capturing function, or is driven by motion detecting technique to actuate the image capturing function.

4. The video doorbell system of claim 1, further comprising:
a pressing unit electrically connected to the video generating module and adapted to generate a control signal while being actuated to switch the mode switching controller from the first mode to the second mode.

5. The video doorbell system of claim 4, wherein the video generating module further comprises an image capturing unit, a first circuit switch and a second circuit switch, the first circuit switch is electrically connected to the image capturing unit in a series connection, the second circuit switch is electrically connected to the image capturing unit in a parallel connection, the first circuit switch is short-circuited in the first mode to connect the external power source with the power storing component and the image capturing unit and is further open-circuited while the pressing unit is actuated, the second circuit switch is open-circuited in the first mode and is further short-circuited while the pressing unit is actuated to generate the control signal.

6. The video doorbell system of claim 5, wherein the video generating module provides a clocking function, the second circuit switch is switched from a short-circuited mode to an open-circuited mode after a first period, and the first circuit switch is switched from the open-circuited mode to the short-circuited mode after a second period different from the first period.

7. The video doorbell system of claim 4, wherein the video generating module further comprises an image capturing unit, a first circuit switch, a second circuit switch and a third circuit switch, the first circuit switch is electrically connected to the image capturing unit in series connection, the second circuit switch and the third circuit switch are electrically connected to the image capturing unit in parallel connection, the first circuit switch is short-circuited in the first mode to connect the external power source with the power storing component and the image capturing unit and is further open-circuited while the pressing unit is actuated, the second circuit switch and the third circuit switch are open-circuited in the first mode, the second circuit switch is short-circuited while the pressing unit is actuated to generate the control signal, and the third circuit switch is short-circuited while the second circuit switch is open-circuited.

8. The video doorbell system of claim 7, wherein the video generating module provides a clocking function, the second circuit switch is switched from a short-circuited mode to an open-circuited mode after a first period, the first circuit switch is switched from the open-circuited mode to the short-circuited mode after a second period, a third period is counted by the video generating module while the first period is ended and the third circuit switch is switched from the short-circuited mode to the open-circuited mode after the third period, the second period is different from the first period and larger than an amount of the first period and the third period.

9. The video doorbell system of claim 7, wherein the control signal is actuated to switch the mode switching controller by a wireless transmitting manner.

10. A power supply adjusting method applied to a video doorbell system, the video doorbell system being coupled with a ringtone generating unit, the video doorbell system comprising a video generating module, a mode switching controller and a pressing unit, the mode switching controller being electrically connected between an external power source, the ringtone generating unit and the video generating module, the mode switching controller being adapted to switch into a first mode for conducting the external power source and the video generating module or a second mode for conducting the external power source and the ringtone generating unit, the video generating module comprising a power storing component and being adapted to execute an image capturing function, the power supply adjusting method comprising:
switching the mode switching controller from the first mode to the second mode in a remote controlling manner by a control signal generated by actuation of the pressing unit so as to bypass the video generating module and to connect the external power source with the ringtone generating unit, wherein the power storing component provides energy to the video generating module for execution of the image capturing function; and
switching the mode switching controller as changing into the first mode automatically according to a clocking function of the mode switching controller, so as to bypass the ringtone generating unit and to connect the external power source with the video generating module for charging the power storing component by the external power source.

11. The power supply adjusting method of claim 10, wherein the video generating module is driven by the power storing component to actuate an image capturing function, or is driven by motion detecting technique to actuate the image capturing function.

12. The power supply adjusting method of claim 10, wherein the video generating module comprises an image capturing unit, a first circuit switch and a second circuit switch, the first circuit switch is electrically connected to the image capturing unit in a series connection, the second circuit switch is electrically connected to the image capturing unit in a parallel connection, a step of the mode switching controller bypassing the video generating module to connect the external power source with the ringtone generating unit comprises:
switching the first circuit switch into an open-circuited mode so that the video generating module is charged by the power storing component; and
switching the second circuit switch into a short-circuited mode to generate the control signal;
a step of the mode switching controller bypassing the ringtone generating unit to connect the external power source with the video generating module comprises:
switching the mode switching controller into the first mode while the second circuit switch is open-circuited; and
switching the first circuit switch into the short-circuited mode to connect the external power source with the power storing component and the image capturing unit.

13. The power supply adjusting method of claim 12, wherein the video generating module provides a clocking function, the second circuit switch is switched from the short-circuited mode to the open-circuited mode after a first period, and the first circuit switch is switched from the open-circuited mode to the short-circuited mode after a second period different from the first period.

14. The power supply adjusting method of claim 10, wherein the video generating module comprises an image capturing unit, a first circuit switch, a second circuit switch and a third circuit switch, the first circuit switch is electrically connected to the image capturing unit in series connection, the second circuit switch and the third circuit switch are electrically connected to the image capturing unit in parallel connection, a step of the mode switching controller bypassing the video generating module to connect the external power source with the ringtone generating unit comprises:

switching the first circuit switch into an open-circuited mode so that the video generating module is charged by the power storing component;

switching the second circuit switch into a short-circuited mode to generate the control signal; and switching the third circuit switch into the short-circuited mode while the second circuit switch is open-circuited;

a step of mode switching controller bypassing the ringtone generating unit to connect the external power source with the video generating module comprises:

switching the mode switching controller into the first mode while the third circuit switch is open-circuited; and switching the first circuit switch into the short-circuited mode to connect the external power source with the power storing component and the image capturing unit.

15. The power supply adjusting method of claim 14, wherein the video generating module provides a clocking function, the second circuit switch is switched from the short-circuited mode to the open-circuited mode after a first period, the first circuit switch is switched from the open-circuited mode to the short-circuited mode after a second period, a third period is counted by the video generating module while the first period is ended and the third circuit switch is switched from the short-circuited mode to the open-circuited mode after the third period, the second period is different from the first period and larger than an amount of the first period and the third period.

16. The power supply adjusting method of claim 10, wherein the control signal is actuated to switch the mode switching controller by a wireless transmitting manner.

* * * * *